United States Patent [19]

Hayashi et al.

[11] 4,350,065
[45] Sep. 21, 1982

[54] RECIPROCATING TRAVELLING SHEAR

[75] Inventors: Shigeki Hayashi, Tokyo; Mitsuo Kusakabe, Kōbe, both of Japan

[73] Assignees: Nusco Kabushiki Kaisha; Kusakabe Denki Kabushiki Kaisha, both of Tokyo, Japan

[21] Appl. No.: 205,493

[22] Filed: Nov. 10, 1980

[30] Foreign Application Priority Data

Nov. 22, 1979 [JP] Japan .................. 54-151857

[51] Int. Cl.³ ............... B23D 21/00; B23D 25/00
[52] U.S. Cl. ...................... 83/287; 83/295; 83/320; 83/369
[58] Field of Search ............ 83/287, 295, 318–320, 83/369

[56] References Cited

U.S. PATENT DOCUMENTS 3,919,906 11/1975 Law .................. 83/369 X
4,175,455 11/1979 Genis ................ 83/295 X

FOREIGN PATENT DOCUMENTS 54-23280 2/1979 Japan .................. 83/369

Primary Examiner—James M. Meister
Attorney, Agent, or Firm—Pollock, VandeSande & Priddy

[57] ABSTRACT

In a reciprocating travelling shear in which a tool post travels reciprocatingly in the travelling direction of a travelling material and a cutting tool held by the tool post is made to move vertically by press mechanism to cut the material, the press mechanism is driven by a first DC motor, which is controlled by first numerical control means, the reciprocating travelling of the tool post is controlled by a second DC motor, which is controlled by second numerical control means, and the second numerical control means supplies a cut command to the first numerical control means thereby to drive the first motor when the tool post has travelled a predetermined distance.

11 Claims, 6 Drawing Figures

RECIPROCATING TRAVELLING SHEAR

BACKGROUND OF THE INVENTION

This invention relates to a reciprocating travelling shear designed to cut material by making a tool post travel reciprocatingly in parallel with the travelling material, such as pipe and sheet, and by moving the cutting tool held by the tool post vertically by a press while the tool post is travelling in the same direction as the material.

In the conventional reciprocating travelling shear, the tool post is held between a lower rail and an upper rail is made to slide along these rails. The press ram is fixed on the upper rail and one end of each of two crank arms, arranged in the extending direction of the rail, is installed on the top surface of the ram freely rotatably.

The other ends of each of these crank arms are respectively connected to gears, and between these gears is provided a drive gear engaging with both gears. The drive shaft of the drive gear is coupled with a flywheel through a clutch and the flywheel is driven by a motor. The engagement and disengagement of the clutch is performed by pneumatic control. A friction disk brake is employed to control the rotation of the drive shaft when the clutch is disengaged. When the drive gear is rotated one turn, the upper rail makes a vertical movement through the crank arm towards the lower rail. At this time the upper blade held by the tool post also moves vertically and, in cooperation with the lower blade of the tool post, cuts the material travelling between the two blades. In other words, the machine cuts the material through press operation. In the state where the travelling speed of the material is the same as the travelling speed of the tool post and the material protrudes from the cutting tool by the set cut length, said drive gear is rotated one turn to move the upper blade vertically to cut the material to set length. As has been described so far, in the conventional reciprocating travelling shear, control of the drive gear was made by clutch and brake. The clutch was controlled pneumatically and the response speed was slow compared with the control by electric signals. Therefore, it was difficult to obtain an accurate cutting timing. The damping force of the brake is affected by ambient temperature. With the increase in the number of times of use, the temperature of friction plate rises, resulting in the unfixed stop position of the upper rail. It, therefore, is impossible to replace automatically the cutting tool during continuous operation.

Moreover, as was described before, due to both the inaccuracy in the cutting time by clutch control and the inaccuracy in the stopping position of the upper rail caused by temperature rise of the brake, if the tool post shifts from the center part of the ram and the upper rail in their extending direction, dispersion of the cutting resistance in the forward and backward directions about the center part of the upper rail becomes unbalanced. As a result, the machine fails to perform favorable cutting. Furthermore, since both the clutch and the brake have a short service life, they require frequent replacement. In view of the operation delay these two have, there is a limit in the number of times of cutting operation per unit time, making it impossible to perform high speed operation.

An object of this invention is to provide a reciprocating travelling shear in which the stop position of the upper blade is always fixed and accordingly the replacement of cutting tool can be made without delay.

Another object of this invention is to provide a reciprocating travelling shear capable of performing a cutting operation at the center part of the ram and accordingly capable of performing favorable cutting without destroying the machine and cutting tool.

Still another object of this invention is to provide a reciprocating travelling shear capable of increasing the number of cuts per unit time over that of conventional machine.

Still another object of this invention is to provide a reciprocating travelling shear which has a long service life and which generates almost no noise.

SUMMARY OF THE INVENTION

In a reciprocating travelling shear, in which a tool post is made to run reciprocatingly in the travelling direction of a travelling material and the material is cut by controlling with a press mechanism a cutting tool held by the tool post, in accordance with this invention, a first DC motor is provided whose rotary shaft and press mechanism are coupled to each other so that the press mechanism is controlled by the rotating force of the first DC motor; the rotation of the first DC motor is controlled by a first numerical control means. A second DC motor is also provided and, by the rotation of this second DC motor, the tool post is made to travel reciprocatingly, the rotation of the second DC motor is controlled by a second numerical control means corresponding to the cut length of the material. In other words, when, for example, the difference between the set cut length and the distance the material has travelled is below a predetermined value, the tool post is made to travel from the predetermined position in the same direction as the material and, when the tool post has travelled a predetermined distance, the first DC motor is made to rotate to move the press mechanism once vertically to cut the material. After the cutting, the tool post is returned to said predetermined position and stopped there by the control of said second numerical control means.

In this way, by employing numerical control for both the travel control of the tool post and the control of press mechanism, the material can be cut when the tool post has travelled to the predetermined position, thereby ensuring constant mechanical balance without application of undue force to any part. And in the stop state where the tool post has returned to the predetermined position, the upper blade of the cutting tool of the tool post can always be set at a predetermined position, facilitating replacement of the upper blade.

DETAILED DESCRIPTION OF THE PREFERRED EMBODIMENTS

Figure 1:
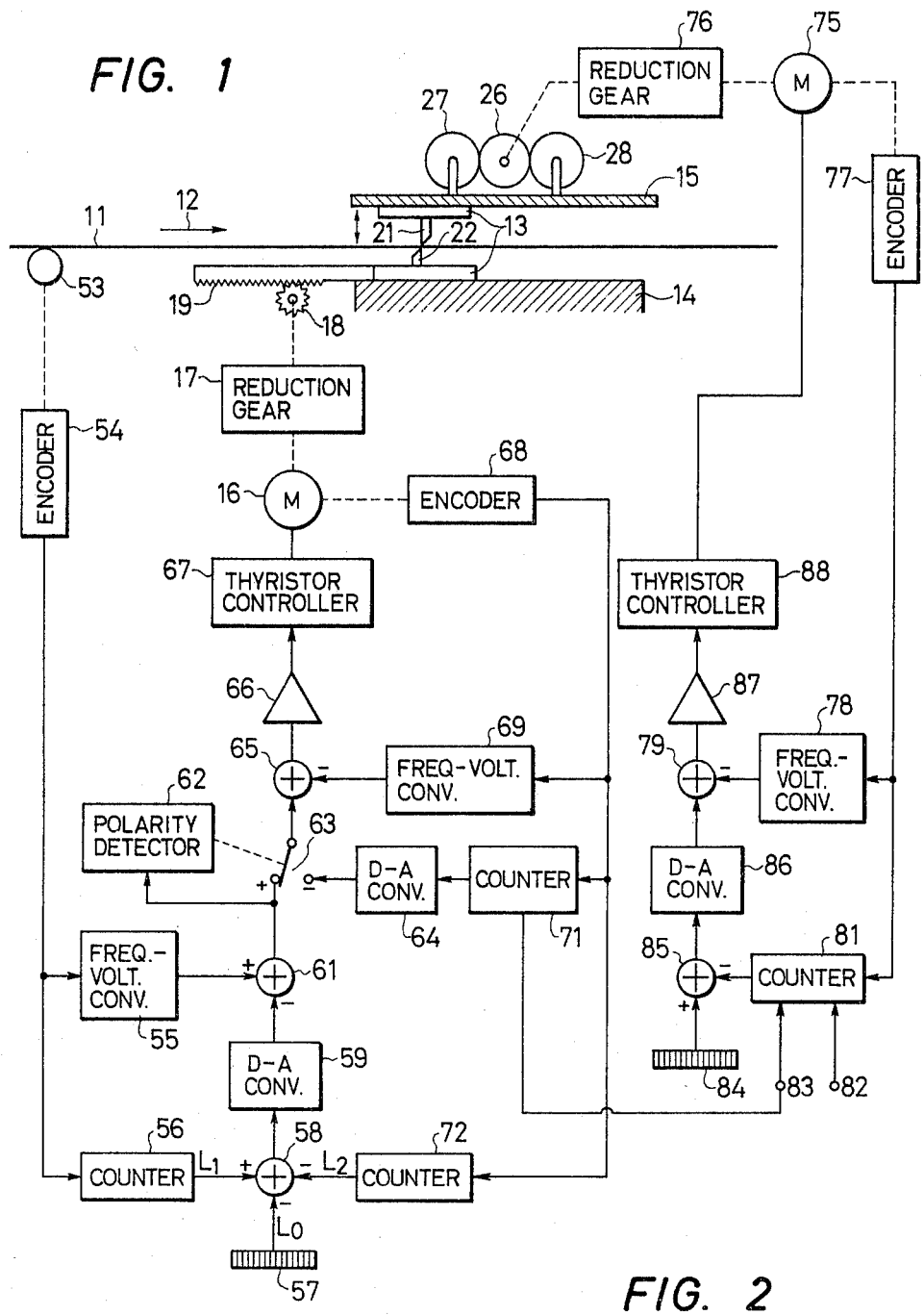
FIG. 1 is a block diagram showing mainly the electrical components in an example of the reciprocating travelling shear according to the present invention.

On the reciprocating travelling shear shown in FIG. 1, a material 11 such as pipe or sheet is made to travel continuously in the direction shown by an arrow 12, for example from left to right in the drawing, and a tool post 13 is made to move reciprocatingly in the travelling direction of the material 11. The tool post 13 is held between a lower rail 14 and an upper rail 15 and is made to slide along them. For example, the rotary shaft of a travelling motor 16 is coupled to a pinion 18 by way of a reduction gear 17, the pinion 18 is made to engage with a rack 19, the rack 19 is moved in parallel with the material 11, and the rack 19 is coupled with the tool post 13.

In the initial state the tool post 13 is positioned at a point called home position, and when the moved length of the material 11 has reached a certain value corresponding to a set cutting length, the tool post 13 starts to be accelerated. In the state where the tool post 13 is moving at the same speed as the material 11 and where the material 11 has protruded from the blade of the tool post 13 by the set cutting length, the upper rail 15 descends to move rapidly the upper blade 21 of the tool post 13 downward, and the upper blade 21 and the lower blade 22 work together to cut the material 11. After cutting the material 11 in this way, the tool post 13 is moved in a direction opposite to the travelling direction of the material 11 to return to the home position and waits for the next cutting operation.

Figure 3:
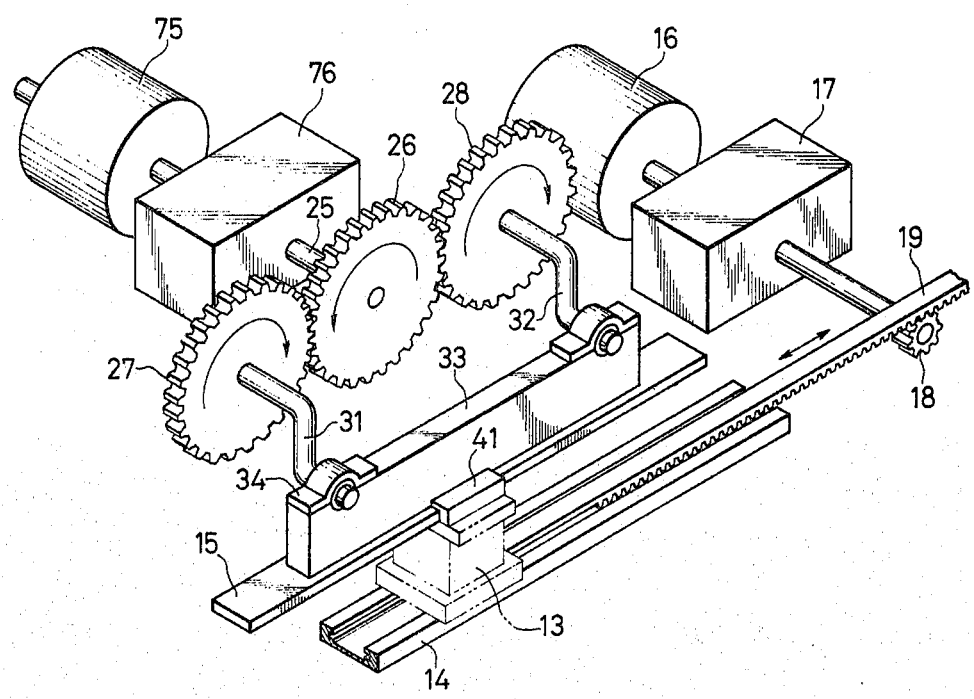
FIG. 3 is a perspective view showing an example of the relationships among the press mechanism, its drive section, the tool post, and the guide rails for the tool post.

FIG. 3 shows an example of a mechanism for raising and lowering the upper rail 15. The mechanism shown in FIG. 3 is the same as the press mechanism of the conventional reciprocating travelling shear except for a drive motor 75 and a reduction gear 76.

Drive gears 27 and 28 are mounted on both sides of a drive gear 26 mounted on a drive shaft 25. The gears 27 and 28 are engaged with the drive gear 26. To each of the shafts of the gears 27 and 28, one end of each of crank arms 31 and 32 is fixed at a right angle to these shafts. The other end of each of the crank arms 31 and 32 is connected rotatably to a half bearing 34 mounted on the upper side of a ram 33 of the press. On the bottom surface of the ram 33 is fixed the upper rail 15 in parallel to the ram. Accordingly, when the drive shaft 25 rotates, the crank arms 31 and 32 also rotate simultaneously, and the upper rail 15, which is in parallel with the lower rail 14, performs vertical motion and reciprocating motion in the material travelling direction.

Figure 4:
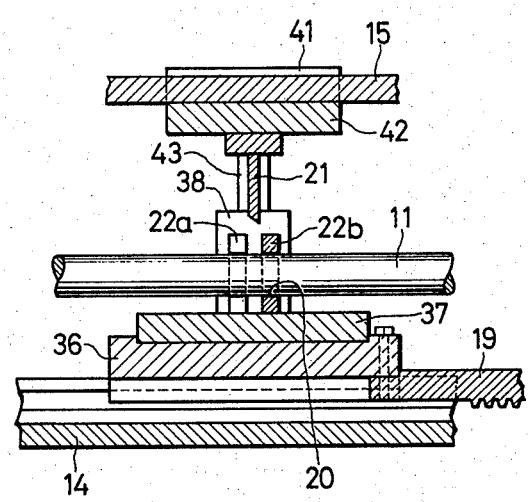
FIG. 4 is a front view showing the relationship between the tool post and the guide rails.
Figure 5:
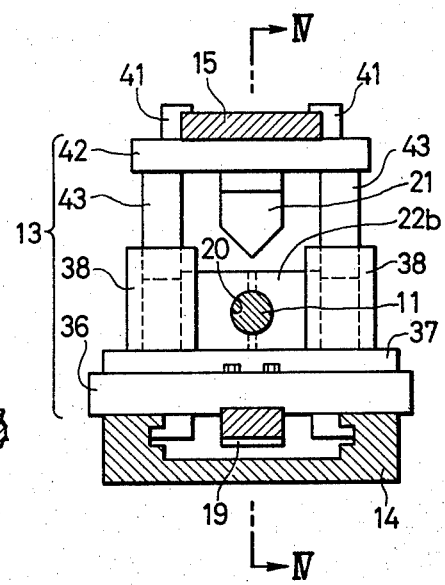
FIG. 5 is a side view of FIG. 4.

In the tool post 13, simply shown by broken line in FIG. 3 and further detailed in FIGS. 4 and 5, a stand 36 is arranged on the lower rail 14 in such a way as to be able to move guided by the upper and lower rails 15 and 14 a fixed plate 37 is mounted on the stand 36 and two cylindrical bodies 38 are mounted on the fixed plate 37 in an alignment perpendicular to the moving direction of the stand 36. A movable plate 42 is disposed above the stand 36 in an opposing relation therewith, the movable plate 42 being held to the upper rail 15 by holding fixtures 41 so as to be movable on the bottom surface of the upper rail 15, and two guides posts 43, one end of each of which is fixed to the bottom of the movable plate 42, are inserted respectively into the cylindrical bodies 38. Midway between these two guide posts 43, the upper blade 21 is fixed on the center bottom surface of the movable plate 42 in the width direction thereof, and the lower blade 22 is mounted to the fixed plate 37.

In this example, the material 11 to be cut is a pipe, and there are provided additional blades 22a and 22b facing the lower blade 22, in which a hole 20 is made for passing the pipe. The upper blade 21 moves up and down between the lower blade 22 and the blades 22a and 22b.

In the state where the drive gear 26 described in FIG. 3 is not rotating, the ram 33 is farthest apart from the lower rail 14 the movable plate 42 is raised by the upper rail 15 by means of the holding fixture 41, and the upper blade 21 is held above the material 11 without touching it. When the drive gear 26 is rotated, the ram 33 moves downward to push down the movable plate 42. With this operation, the lower end of the upper blade 21 engages and passes through the material 11, cuts the material 11 in cooperation with the lower blade 22 and then, with upward travel of the ram 33, the upper blade 21 returns to its original position. In other words, the material is cut off by the press mechanism.

Figure 6:
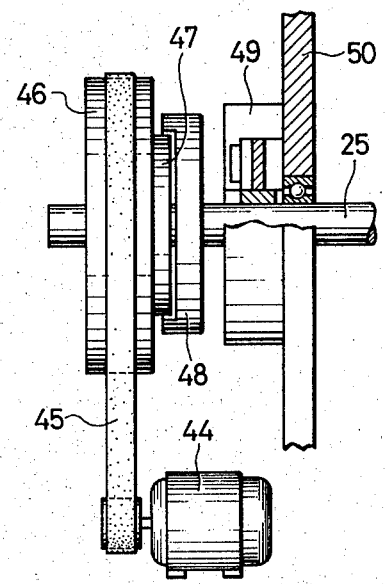
FIG. 6 is a side view showing a conventional press mechanism drive means.

In the conventional travelling shear, so-called clutch and brake have been used to control the drive gear 26. As shown in FIG. 6, a flywheel 46 is rotated constantly by an induction motor 44 by way of a belt 45. A brake 49 for the drive shaft 25 is provided on the lateral side of a holding plate 50 which holds with its bearing the drive shaft 25, and the clutch 47 for the flywheel 46 is mounted on the end of the drive shaft 25. Now, when the clutch 47 is engaged, the brake 49 is released to transmit the rotation of the flywheel 46 to the drive shaft 25. Engagement and disengagement of the clutch 47 is generally made by pneumatic control which is applied to a cylinder 48. The brake 49 operates to stop the drive shaft 25 immediately when the clutch 47 is disengaged.

This conventional clutch-brake type control on the drive shaft 25 has the following drawbacks. Unlike electric signals, the pneumatic signals have a delay and since the response is not quick, their control timing is incorrect. Accordingly, it is very difficult to control the cutting time correctly. Moreover, since a friction plate is used as the brake 49, the damping force of the brake 49 is affected by the ambient temperature. With an increase in their service, the temperature of the friction plate rises to change greatly the stop angle by brake. For this reason, it is difficult to stop the ram 33 at a fixed position and the ram 33 does not always stop at a predetermined position. Accordingly, it is difficult to perform automatic replacement of the cutting tool during continuous operation due to the inaccuracy of the stop position of the cutting tool. The only way left is to stop, as in the conventional case, the travelling of the material 11 once and change the cutting tool manually. As was described above, since the control of cutting time by use of clutch and brake is inaccurate, the tool post 13 displaces in many cases from the center of the upper rail 15 in the material travelling direction when performing the cutting operation. For this reason, it is difficult to hold a favorable cutting state in which the cutting resistance is dispersed in forward and backward directions about the center section. Further, the clutch and brake system has the limited number of operations per minute due to operation delay and generation of heat, which is about 40 to 50 times per minute at most. And since pneumatic control is employed, very loud noise is generated by the application and exhaustion of the air pressure, which forms one of the causes of factory pollution. Finally it must be pointed out that the most serious defect that the clutch and brake system has is that the life of clutch and brake is very short and they must be replaced very often.

Next, an example of a reciprocating travelling shear according to this invention will be described. In this invention, the travelling of the tool post 13 is numerically controlled. For example, a length measuring roller 53 is made to contact the material 11, as shown in FIG. 1, a length measuring encoder 54 is driven by the rotation of the length measuring roller 53, and a fixed number of length measuring pulses are generated from the length measuring encoder 54 for each unit length travelled by the material 11. The length measuring pulses are converted into a speed signal which corresponds to the speed of the material 11 by a frequency-voltage converter 55 and, at the same time, the pulses are counted by a length measuring counter 56. The length measuring counter 56 is reset at each cutting and the content of the count corresponds to the travelling distance of the material 11. The difference between the count value L1 of the length measuring counter 56 and a cutting length L0 set in the cutting length setter 57 is obtained by a digital adder 58. The output of the adder 58 represents the residual length by which the material 11 must outstrip the cutting tool. The output is converted into an analog signal by a DA converter 59, and the difference between this converted output and the output of frequency-voltage converter 55 is obtained by an analog adder 61. In this case, the output of the DA converter 59 is subtracted from the output of the frequency-voltage converter 55. Accordingly, while the residual length is long, the output of the DA converter 59 exceeds the output of the frequency-voltage converter 55 and the output of the adder 61 is negative in polarity.

The polarity of the output of the adder 61 is detected by a polarity detector 62. When it is negative, a selector switch 63 is connected to the output side of a DA converter 64. On the other hand, when it is positive, the selector switch 63 is connected to the output side of the analog adder 61. When the travel of the material 11 has advanced and its travelled length approaches the set cut length, the residual length becomes smaller, the output of the analog adder 61 becomes positive, and the switch 63 is switched over to the analog adder 61 side. Accordingly, the positive signal coming from the analog adder 61 is applied to a speed control amplifier 66 by way of an analog adder 65. A thyristor controller 67 is controlled by the output of the amplifier 66 and, by its output, the DC motor 16 is driven. Then the tool post 13 that has been resting at the home position starts moving in the travelling direction of the material 11.

An encoder 68 for the tool post is rotated by the rotation of the DC motor 16, and a fixed number of pulses are generated per unit length of travel of the tool post 13. These pulses are converted into a voltage corresponding to the frequency of the pulses, by a frequency-voltage converter 69. The converted output corresponds to the travelling speed of the tool post 13 and is supplied to the analog adder 65 to be subtracted from the input from the switch 63. The pulses from the encoder 68 are also supplied to counters 71 and 72, where the values corresponding to the distance travelled by the tool post 13 is counted. The count value L2 of the counter 72 is input to the digital adder 58 so as to be added to the set cutting length L0, whereby the material 11 travels a further distance corresponding to the distance travelled by the tool post 13. As a result, when the length of material 11 protruding from the cutting tools 21 and 22 is equal to the set cutting length L0, the material 11 travels at the same speed as the tool post 13. The cut command is generated under this condition, which will be described later.

When the material 11 is cut off, the length measuring counter 56 is reset. As a result, the outputs of the adder 58 and DA converter 59 are greatly increased, the output of the analog adder 61 becomes negative, and the switch 63 is switched over to the DA converter 64 side. The DA converter 64 is used to convert the count value of the counter 71 into an analog signal. The output of the DA converter 64 is input to the adder 65 in the same polarity as the output of the frequency-voltage converter 69. Accordingly, the input to the speed control amplifier 66 becomes negative, the rotation of the motor 16 is reversed and the tool post 13 starts to move in the opposite direction. At this time, the output of the frequency-voltage converter 69 has a polarity reverse to that for the period the tool post 13 is travelling in the material moving direction.

The counter 71 down-counts the pulses of the encoder 68. As a result, when the tool post 13 has moved backward by the distance it travelled together with the material 11, the output of the counter 71 becomes close to zero and the tool post 13 returns to the home position and there it stops. Cutting is repeated by repeating the operations described above.

In this invention, the DC motor 75 is coupled to the press mechanism and the vertical motion of the press is made by numerical control related to the travel of the tool post 13. For example, as shown in FIGS. 1 and 3, the shaft of the DC motor 75 is coupled to the drive shaft 25 via the reduction gear 76. An encoder 77 is rotated and driven by the DC motor 75 and generates, for example, 360 pulses when the drive gear 26 rotates one turn. These pulses are converted into a signal related to the rotation speed of the drive gear 26 by a frequency-voltage converter 78, and this signal is supplied to an analog adder 79. The pulses of the encoder 77 are also supplied to a counter 81 and counted by it. The output of a sensor, not shown, for detecting the original position of the rotation of the drive gear 26 is supplied to the terminal 82 of the counter 81 and the counter 81 is preset to the value (360 in this example) which corresponds to the position of the sensor after one revolution. The difference between the count value of the counter 81 and the set value from a setter 84, which is 360 in this example, is detected by the adder 85 and used as a position feedback signal. The output of the adder 85 is converted into an analog signal by a DA converter 86, and the converted analog signal is supplied to a speed control amplifier 87 by way of the adder 79. A thyristor controller 88 is controlled by the output of the amplifier 87 and, thereby the DC motor 75 is controlled.

As was described before, when the rotation of the drive gear 26 is positioned at the original point, the output of the adder 85 is almost zero and the motor 75 almost stands still while holding the drive gear 26 at the original angular position. For example, when a cut command is given to the terminal 83, the counter 81 is reset to the count value which corresponds to the start position. The output of the adder 85 is almost 360 which is converted into an analog signal and supplied to the thyristor controller 88 by way of the adder 79 and the amplifier 87. As a result, the motor 75 starts to rotate. The encoder 77 is also rotated to generate pulses which are counted by the counter 81. When the gear 26 comes near the end of one revolution, the count value of the counter 81 approaches 360 in this example, and the motor 75 starts deceleration to stop the drive gear 26 at the original angular position. In this way, when the cut command is given, the drive gear 26 makes one revolution accurately and one cutting operation is performed by the vertical motion of the upper blade 21. The blade keeps the predetermined position after ending the cutting.

The simplest way to produce the cut command to be given to the terminal 83 is to detect, in relation to the travel control of the tool post 13, that the count of the counter 71 has reached a certain preset value and to use the detected output as the cut command. In this invention where both the cutting tool and the tool post are numerically controlled, it is easy to control the cutting operation so it will be done at the center of the ram 33. The revolution time from when the drive gear 26 starts at the original angular position to when it reaches the cutting angular position where the upper blade engages with the material, is determined accurately. The time required for the tool post 13 to start from the home position and come to the center of the ram 33 is accurately determined in accordance with the material speed. Therefore, it is sufficient to select the timing of generation of the cut command from the counter 71 so that cutting will be started at the center of the ram 33.

Figure 2:
FIG. 2 is a block diagram showing another example of cut command generating means.

In the case where the material speed takes various values, the signal from the length measuring encoder 54 is supplied to an arithmetic circuit 91 as shown in FIG. 2. This arithmetic circuit 91 has stored therein the work time of the drive gear 26 from the start to the cutting angle and the travelling time which is determined by the material speed and the distance from the home position of the tool post 13 to the center of the ram 33. The material speed is calculated from the pulses coming from the length measuring encoder 54, and, in reference to the calculated speed, a stored travelling time is read out. Based on the read out travelling time and said work time, a residual length where the cut command is to be issued is calculated. An instantaneous residual length, which is the output of the adder 58, is supplied to the arithmetic circuit 91. When the instantaneous residual length agrees with the residual length calculated before to issue the cut command, the cut command is supplied to the terminal 83. It is also possible to get the same result by storing, beforehand, residual lengths at which the cut command is to be issued corresponding to the various material speeds, reading out a residual length corresponding to the material speed detected, and comparing it with the instantaneous residual length given by the adder 58. Alternatively, since the distance between the home position and the ram center and the work time from the start of the drive gear 26 to the cut angle are constant, it is also possible to issue the cut command by arithmetic operation using these constant values and the detected material speed. In any case, when the material speed is slow, the cut command may be given some time after the tool post starts. When the material speed is high and the press working time is long, the cut command may be given before the tool post starts to travel.

As has been described so far, according to the reciprocating travelling shear of the present invention, the stop position of the upper blade 21 is always fixed since the control of the cutting tool or the vertical motion of the press ram is performed by numerical control in relation to the travel of the tool post 13. Accordingly, when the tool post 13 returns to its home position, the vertical and horizontal positions of the upper blade 21 are always fixed by numerical control. This enables a worn upper blade 21 to be replaced with a new one immediately at the home position. Moreover, it is possible to perform the cutting operation at the center of the ram 33 and to give the force applied to the ram 33 to the cutting tool effectively. Since no undue force is applied to the machine and cutting tool, they are free from damage, resulting in extended service life.

Moreover, it is possible to perform a continuous cutting operation without stopping the drive gear 26 every time the cutting is performed. For example, it is possible to perform cutting by reaccelerating the drive gear 26 which is under deceleration when the output of the digital adder 58, or the residual length, becomes lower than a predetermined value. This makes it possible to obtain many more cuts per minute than that of the conventional shear. Furthermore, since the prior art clutch and brake are not used, no noise is generated and the life of the machine is remarkably extended.

What is claimed is:

1. A reciprocating travelling shear comprising: a tool post which reciprocatingly travels in the travelling direction of a travelling material; a press mechanism which cuts said material with a cutting tool held by said tool post by raising or lowering a press ram; a first DS motor coupled to said press mechanism and used to drive it; first numerical control means which, in relation with the travel of said tool post, controls the rotation of said first DC motor to reciprocatingly move said press ram once in a vertical direction when said tool post passes a predetermined position; a second DC motor which, coupled to a mechanism for reciprocating said tool post, drives said mechanism; cut length setting means for setting a cut length of said material; and second numerical control means for controlling, in relation with the set cut length and the travelling of said material, said second DC motor to move said tool post reciprocatingly.

2. A reciprocating travelling shear according to claim 1, in which said first numerical control means comprises: a first encoder which generates a pulse every time said first DC motor rotates a unit angle; press setting means for setting the number of pulses which corresponds to the revolution angle of said first DC motor needed to move said press ram once vertically and reciprocatingly; first digital subtracting means which subtracts the number of pulses coming from said encoder from said set value of said press setting means; first DA conversion means for converting the subtraction result into an analog signal; first speed detecting means for detecting the revolution speed of said first motor; a first analog subtractor which produces a difference between the speed detected by said first speed detecting means and the output of said first DA conversion means; and means for controlling said first DC motor with the output of said analog subtractor.

3. A reciprocating travelling shear according to claim 2, in which said press setting means is set to a value corresponding to the original position so that, in response to a cut command, said first numerical control means moves said press ram once vertically and reciprocally and stops it at said original position and then holds said press ram at said original position.

4. A reciprocating travelling shear according to claim 3, in which a first counter for counting the pulses of said first encoder is provided, the difference between the count value of said first counter and the set value of said press setting means is taken by said first digital subtracting means, and said first counter is reset by said cut command to control the rotation of said first DC motor.

5. A reciprocating travelling shear according to one of claim 1, in which said tool post is disposed between lower and upper rails so as to be guided by these rails; a part of said tool post on which an upper blade of said cutting tool is installed is allowed to move vertically and, at the same time, engaged with said upper rail in a vertical direction thereby being allowed to move freely along said upper rail; said press mechanism includes said press ram fixed on said upper rail; one end of each of first and second crank arms, which is aligned in the travelling direction of said material, is connected to said press ram rotatably; and the other ends of said first and second crank arms are connected to each other so as to be rotated by said first DC motor in the same direction simultaneously.

6. A reciprocating travelling shear according to claim 5, in which is provided means for supplying said cut command to said first numerical control means so that said upper blade will press and cut said material approximately at the center between said pair of crank arms.

7. A reciprocating travelling shear according to one of claims 1 through 6, in which said second numerical control means comprises a second encoder which generates a pulse every time said material moves a unit length; second digital subtracting means which takes the difference between the number of pulses generated by said second encoder and the set length of said cut length setting means; second DA conversion means for converting said difference into an analog signal; material travelling speed detecting means for detecting the travelling speed of said material, second analog subtracting means which takes the difference between said material speed and said analog signal supplied from said second DA conversion means; control means which, when the subtracted value of said second digital subtracting means becomes a predetermined value, drives said second DC motor in forward direction by the output of said second analog subtracting means and makes said tool post travel in the same direction as said material from a predetermined position; a third encoder which generates a pulse every time said second DC motor rotates a unit angle; means for adding the number of pulses generated by said third encoder to the output of said second digital subtracting means; second speed detecting means for detecting the revolution speed of said second DC motor; means for subtracting the detected speed from the output of said second analog subtracting means, and tool post returning means which, after said cutting tool cuts said material, rotates said second motor in reverse direction to move said tool post in the direction opposite the material travelling direction by the distance it has travelled and stops the tool post at said predetermined position.

8. A reciprocating travelling shear according to claim 7, in which said tool post returning means comprises a reversible counter which upcounts the pulses of said third encoder while said tool post is travelling in the same direction as said material and downcounts the pulses of said third encoder while said tool post is travelling in the direction opposite said material; third DA conversion means for converting the count value of said reversible counter into an analog signal; and switching means which, after the cutting, supplies the output of said third DA conversion means as the control signal for said second DC motor instead of supplying the output of said second analog subtracting means.

9. A reciprocating travelling shear according to claim 8, in which said switching means is means for detecting the polarity of the output of said second analog subtracting means to select the output of said second analog subtracting means or the output of said third DA conversion means depending on the detected polarity.

10. A reciprocating travelling shear according to claim 8, in which there is provided means which, when said reversible counter counts a predetermined value while said tool post is travelling in the same direction as said material, detects said count value and generates said cut command.

11. A reciprocating travelling shear according to claim 7, in which there is provided arithmetical means to which the output of said second encoder and the output of said second digital subtracting means are supplied thereby to generate said cut command at the timing corresponding to the travelling speed of said material.

* * * * *